(12) United States Patent
Yeh et al.

(10) Patent No.: US 10,868,472 B2
(45) Date of Patent: Dec. 15, 2020

(54) POWER CONVERSION CIRCUIT WITH SWITCHING MODES, AND CONTROL METHOD THEREOF

(71) Applicant: DELTA ELECTRONICS, INC., Taoyuan (TW)

(72) Inventors: Yung-Sheng Yeh, Taoyuan (TW); Wen-Lung Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 84 days.

(21) Appl. No.: 16/205,202

(22) Filed: Nov. 29, 2018

(65) Prior Publication Data

US 2019/0356230 A1    Nov. 21, 2019

(30) Foreign Application Priority Data

May 16, 2018 (CN) .......................... 2018 1 0469462

(51) Int. Cl.
*H02M 3/335* (2006.01)
*H02M 1/08* (2006.01)
*H02M 1/00* (2006.01)

(52) U.S. Cl.
CPC ......... *H02M 3/33569* (2013.01); *H02M 1/08* (2013.01); *H02M 2001/0009* (2013.01)

(58) Field of Classification Search
CPC .. H02M 3/335; H02M 3/337; H02M 3/33569; Y02B 70/1433
See application file for complete search history.

(56) References Cited

U.S. PATENT DOCUMENTS

| | | | | |
|---|---|---|---|---|
| 5,528,483 A * | 6/1996 | Mohandes | .............. | H02M 1/32 363/21.07 |
| 6,784,867 B1 * | 8/2004 | Chang | ................ | H05B 41/2824 345/102 |
| 7,064,514 B2 * | 6/2006 | Iwaji | ....................... | H02P 21/00 318/800 |
| 7,313,004 B1 * | 12/2007 | Yang | ................ | H02M 3/33523 363/21.02 |
| 7,417,382 B2 * | 8/2008 | Lin | ....................... | H02M 7/523 315/225 |
| 7,741,893 B2 * | 6/2010 | Cheon | .................... | H03K 4/502 327/291 |

(Continued)

FOREIGN PATENT DOCUMENTS

CN    203482094 U    3/2014
CN    105191097 A    12/2015

(Continued)

*Primary Examiner* — Thienvu V Tran
*Assistant Examiner* — Nusrat Quddus
(74) *Attorney, Agent, or Firm* — CKC & Partners Co., LLC (57) ABSTRACT

A power conversion circuit includes a switching circuit, a resonant circuit, a rectifying circuit, a controller and a transformer including a primary winding and a secondary winding. The resonant circuit is electrically coupled to the switching circuit and the primary winding. The rectifying circuit is electrically coupled to the secondary winding. The controller is electrically coupled to the switching circuit and the rectifying circuit and configured to selectively output one of a frequency modulation signal and a pulse width modulation signal as a second control signal according to a working frequency of a first control signal.

18 Claims, 8 Drawing Sheets

(56) References Cited

U.S. PATENT DOCUMENTS

| | | | |
|---|---|---|---|
| 8,102,164 B2* | 1/2012 | Colbeck | H02M 1/4225 323/271 |
| 8,625,315 B2* | 1/2014 | Erdman | H02M 7/5395 363/41 |
| 9,148,064 B2* | 9/2015 | Liu | H02M 3/33561 |
| 9,667,157 B1* | 5/2017 | Dong | G01R 19/175 |
| 9,785,166 B2* | 10/2017 | Beck | H02M 1/14 |
| 2005/0174818 A1* | 8/2005 | Lin | H02M 3/3376 363/98 |
| 2006/0187686 A1* | 8/2006 | Sun | H02M 3/33592 363/17 |
| 2008/0106243 A1* | 5/2008 | Cheon | H02M 1/36 323/238 |
| 2009/0196080 A1* | 8/2009 | Zhang | H02M 3/33507 363/74 |
| 2011/0007527 A1* | 1/2011 | Liu | H02M 3/33561 363/21.02 |
| 2012/0025720 A1* | 2/2012 | Chen | H02M 3/337 315/185 R |
| 2012/0163037 A1* | 6/2012 | Hong | H02M 3/3387 363/21.02 |
| 2012/0250360 A1* | 10/2012 | Orr | H02M 3/3376 363/21.02 |
| 2012/0262954 A1* | 10/2012 | Duvnjak | H02M 1/4258 363/21.02 |
| 2012/0281434 A1* | 11/2012 | Lin | H02M 3/3376 363/21.02 |
| 2012/0300503 A1* | 11/2012 | Yang | H02M 3/3376 363/21.02 |
| 2013/0229829 A1* | 9/2013 | Zhang | H02M 3/33546 363/16 |
| 2014/0140113 A1* | 5/2014 | Oh | H02M 1/4241 363/89 |
| 2014/0160805 A1* | 6/2014 | Oh | H02M 3/33507 363/21.02 |
| 2015/0109824 A1* | 4/2015 | Chen | H02M 3/22 363/17 |
| 2015/0229220 A1* | 8/2015 | Lee | H02M 1/32 363/21.03 |
| 2015/0280545 A1* | 10/2015 | Afsharian | H02M 1/36 363/21.02 |
| 2016/0016479 A1* | 1/2016 | Khaligh | B60L 11/1812 363/17 |
| 2016/0172958 A1* | 6/2016 | Lee | H02M 1/32 363/21.02 |
| 2016/0172988 A1* | 6/2016 | Chen | H02M 3/33546 363/17 |
| 2017/0179833 A1* | 6/2017 | Adragna | H02M 3/335 |
| 2018/0309373 A1* | 10/2018 | Chang | H02M 3/33523 |

FOREIGN PATENT DOCUMENTS

| | | |
|---|---|---|
| CN | 106358354 A | 1/2017 |
| TW | 201701576 A | 1/2017 |

* cited by examiner

POWER CONVERSION CIRCUIT WITH SWITCHING MODES, AND CONTROL METHOD THEREOF

RELATED APPLICATIONS

This application claims priority to China Application Serial Number 201810469462.6, filed May 16, 2018, which is herein incorporated by reference.

BACKGROUND

Technical Field

The disclosure relates to a circuit and a control method, particularly to a power conversion circuit and a control method of power conversion circuit.

Description of Related Art

Recently, LLC resonant converters are widely applied in various applications since LLC resonant converters are suitable for a wide range of input voltages and high power outputs.

When the load is light, the DC gain curve at a high frequency is distorted resulting from the influence of parasitic capacitance in the LLC resonant converter circuit, so as to make the output voltage of the LLC resonant converter unstable and reduce the conversion efficiency.

SUMMARY

One aspect of the present disclosure is a power conversion circuit including a switching circuit, a resonant circuit, a rectifying circuit, a controller and a transformer. The resonant circuit is electrically coupled to the switching circuit. The transformer includes a primary winding and a secondary winding. The primary winding is electrically coupled to the resonant circuit. The rectifying circuit is electrically coupled to the secondary winding of the transformer. The controller is electrically coupled to the switching circuit and the rectifying circuit and configured to selectively output one of a frequency modulation signal and a pulse width modulation signal as a second control signal according to a working frequency of a first control signal to control the switching circuit.

Another aspect of the present disclosure is a power conversion circuit control method including outputting, by a controller, one of a frequency modulation signal and a pulse width modulation signal as a second control signal according to a working frequency of a first control signal selectively; and converting, by a switching circuit, a DC input voltage into a switching signal according to the second control signal.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the diagrams, some of the conventional structures and elements are shown with schematic illustrations.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure.

It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be understood that, although the terms "first," "second," etc., may be used herein to describe various elements, these elements should not be limited by these terms. These terms are used to distinguish one element from another.

Figure 1:
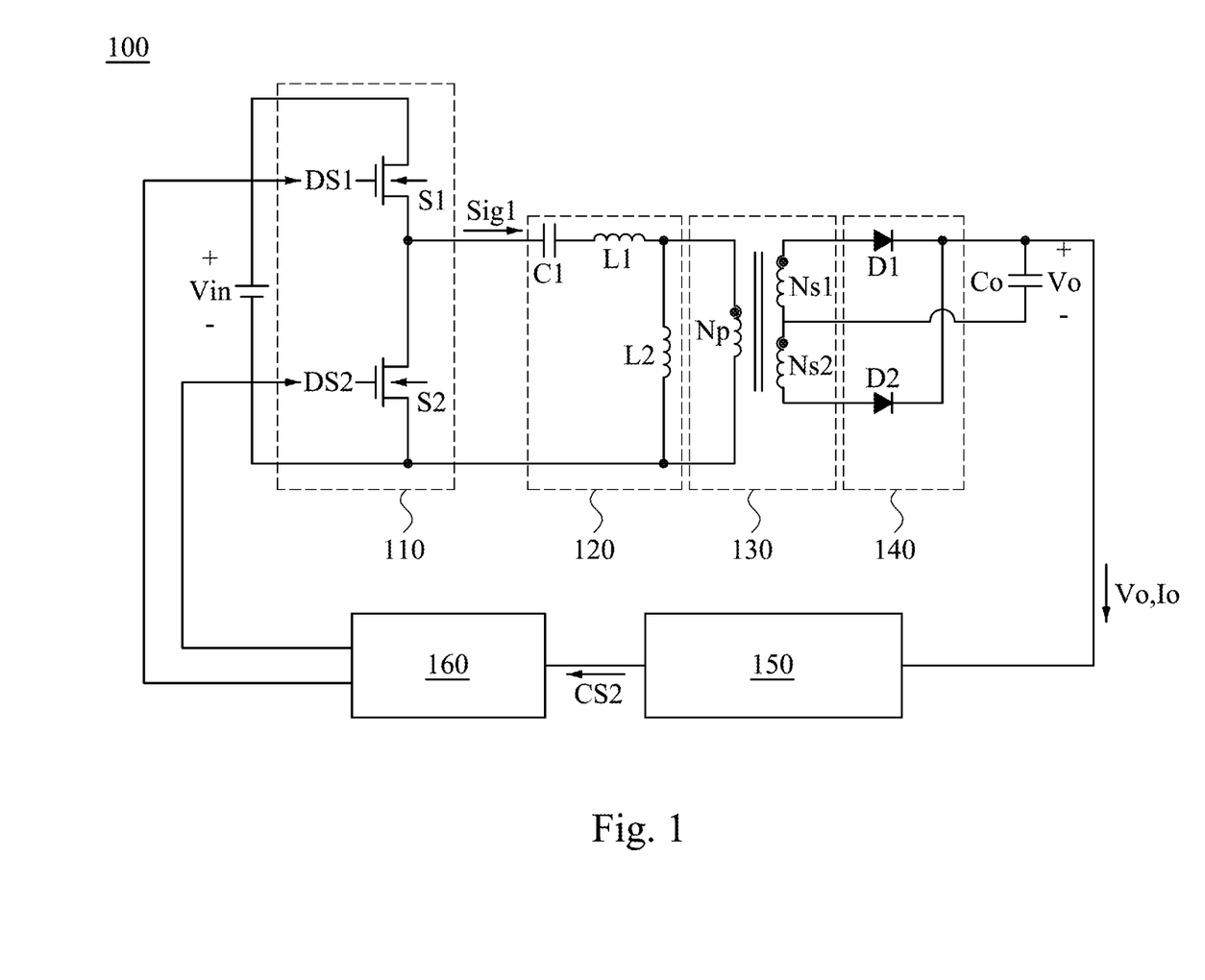
FIG. 1 is a schematic diagram illustrating a power conversion circuit in accordance with some embodiments of the disclosure.

Please refer to FIG. 1. FIG. 1 is a schematic diagram illustrating a power conversion circuit 100 in accordance with some embodiments of the present disclosure. As shown in FIG. 1, in some embodiments, the power conversion circuit 100 includes a switching circuit 110, a resonant circuit 120, a transformer 130, a rectifying circuit 140, an output capacitor Co and a controller 150, in which the transformer 130 includes a primary winding Np and secondary windings Ns1, Ns2. In some other embodiments, the power conversion circuit 110 further includes an isolated driver 160.

In structure, the input terminal of the switching circuit 110 is electrically coupled to the DC voltage source, and is configured to receive the DC input voltage Vin. The output terminal of the switching circuit 110 is electrically coupled to the input terminal of the resonant circuit 120, and configured to output the switching signal Sig1, which is converted from the DC input voltage Vin by the switching circuit 110, to the resonant circuit 120. The output terminal of the resonant circuit 120 is electrically coupled to the primary side of the transformer 130. The output terminal of the rectifying circuit 140 is electrically coupled to the secondary side of the transformer 130. The output terminal of the rectifying circuit 140 is electrically coupled to the output capacitor Co to provide the DC output voltage Vo to a next-stage circuit. The input terminal of the controller 150 is electrically coupled to the output capacitor Co to detect the output voltage Vo and an output current Io. The output terminal of the controller 150 is electrically coupled to an isolated driver 160 to output a second control signal CS2 to the isolated driver 160. The output terminal of the isolated driver 160 is electrically coupled to the switching circuit 110 to output driving signals DS1, DS2 to the switching circuit 110 according to the second control signal CS2. In this way, the controller 150 is able to control the LLC resonant converters, which is formed by the switching circuit 110, the resonant circuit 120, the transformer 130, and the rectifying circuit 140 by the isolated driver 160, by the second control signal CS2.

Specifically, in some embodiments, the controller 150 may be in the primary side, and in some other embodiments, the controller 150 may be in the secondary side. For example, the controller 150 may be realized by various processing circuit, a digital signal processor (DSP), a complex programmable logic device (CPLD), field-programmable gate array (FPGA).

In some embodiments, the primary side of the transformer 130 includes a set of primary winding Np. The secondary side of the transformer 130 includes two sets of secondary winding Ns1, Ns2, in which the starting terminal of the secondary winding Ns2 is electrically coupled to the end terminal of the secondary winding Ns1, and both of them are electrically coupled to the negative terminal of the output capacitor Co. For example, in some embodiments, the transformer 130 may be a secondary sided center-tapped transformer to separate the secondary side of the transformer 130 into the primary winding Ns1 and the secondary winding Ns2, which is electrically coupled to each other. In some embodiments, the transformer 130 may be a transformer of which the secondary side with only one secondary winding with a full-bridge rectifying circuit, the secondary side and the rectifying circuit thereof may be realized by any form according to those of ordinary skilled in the art.

In some embodiments, the switching circuit 110 in the power conversion circuit 100 may be realized by a half-bridge architecture to as a half-bridge resonant conversion circuit, but not intended to limit the disclosure. As shown in FIG. 1, in some embodiments, the switching circuit 110 includes a switch S1 and switch S2. In structure, the first terminal of the switch S1 is electrically coupled to the positive terminal of the DC input voltage Vin, and the second terminal of the switch S1 is electrically coupled to the resonant circuit 120. The first terminal of the switch S2 is electrically coupled to the second terminal of the switch S1, and the second terminal of the switch S2 is electrically coupled to the negative terminal of the DC input voltage Vin. The control terminals of the switch S1 and the switch S2 are configured to receive the driving signals DS1, DS2 respectively, so that the switch S1 and the switch S2 are turned on or off according to the driving signals DS1, DS2.

Accordingly, the switching circuit 110 selectively turns on one of the switch S1 and the switch S2 to output a switching signal Sig1 with a high level (e.g., DC input voltage Vin) when the switch S1 is turned on, and output the switching signal Sig1 with a low level (e.g., zero potential) when the switch S2 is turned on. In other words, the switching frequency and the duty cycle of the switching signal Sig1 will be equal to the switching frequency and the duty cycle of the driving signals DS1, DS2. For example, in a complete switching cycle, the driving signals DS1, DS2 may be pulse width modulation signals, the switch S1 and the switch S2 may be turned on in the respective half of cycle to output the switching signal Sig1 of which the duty cycle is 50%. In addition, in some other embodiments, the switching circuit 110 may be realized by a full-bridge architecture as the LLC resonant converter. For example, the switching circuit 110 may also include four pairs of switches. The switches are selectively turned on or turned off when receiving the corresponding driving signals.

In this way, in one complete cycle, the switching circuit 110 may conduct a pair of switches and cut off another pair of switches to output the switching signal Sig1 with the positive level according to the driving signal in the first half of the cycle, and switch on the cut-off switches and switch off the conducted switches to output the switching signal Sig2 with the negative level according to the driving signal in the second half of the cycle.

In some embodiments, the resonant circuit 120 includes a resonant capacitor unit C1, a resonant inductance unit L1 and a magnetizing inductance unit L2, but not intended to limit the disclosure. In structure, the resonant capacitor unit C1, the resonant inductance L1 and the primary winding Np of the transformer 130 are connected in series. The magnetizing inductance unit L2 and the primary winding Np of the transformer 130 are connected in parallel. For example, as shown in FIG. 1, the first terminal of the resonant capacitor unit C1 is electrically coupled to the first terminal of the resonant circuit 120 and electrically coupled to the second terminal of the switch S1 and the first terminal of the switch S2. The second terminal of the resonant capacitor unit C1 is electrically coupled to the first terminal of the resonant inductance unit L1. The second terminal of the resonant inductance unit L1 is electrically coupled to the first terminal of the magnetizing inductance unit L2. The second terminal of the magnetizing inductance unit L2 is electrically coupled to the second terminal of the resonant circuit 120 and electrically coupled to the negative terminal of the DC input voltage, but not intended to limit the disclosure.

In some embodiment, the resonant inductance unit L1 and the magnetizing inductance unit L2 may include the leakage inductance and the magnetizing inductance of the transformer 130, respectively. In some other embodiments, the resonant capacitor unit C1, the resonant inductance unit L1 and the magnetizing inductance unit L2 may also be electrically coupled through different ways to realize the resonant circuit 120. In addition, in some other embodiments, the resonant circuit 120 may also be realized by one or more inductance units and capacitor units as a LC resonant circuit, a LCC resonant circuit, a LLCC resonant circuit. Therefore, the resonant circuit 120 illustrated in the diagram is merely one possible embodiment of the present disclosure, but not intended to limit the disclosure. In other words, those of ordinary skilled in the art should understand that the resonant circuit 120 in each embodiment of the present disclosure may be any combination of one or more inductance units and one or more capacitor units via various ways to be electrically coupled in series or in parallel to realize resonance.

As shown in FIG. 1, in some embodiments, the rectifying circuit 140 is electrically coupled to the secondary winding Ns1 and the secondary winding Ns2 of the transformer 130 and configured to rectify the secondary current Is outputted according to the variation of signals on the primary winding Np sensed by the secondary winding Ns1 and the secondary winding Ns2, so as to provide the output voltage Vo on two terminals of the input capacitor Co.

In some embodiments, the rectifying circuit 140 includes a diode D1 and a diode D2. In structure, the anode terminal of the diode D1 is electrically coupled to the starting terminal of the secondary winding Ns1. The cathode terminal of the diode D1 is electrically coupled to the positive terminal of the output capacitor Co. The anode terminal of the diode D2 is electrically coupled to the end terminal of the secondary winding Ns2. The cathode terminal of the diode D2 is electrically coupled to the cathode terminal of the diode D1. Therefore, the rectifying circuit 140 and the output capacitor Co rectify and filter the electric signals induced by the secondary windings Ns1 and Ns2 to provide the DC output voltage Vo.

In this way, by the operation of the above circuit, the power conversion circuit 100 is able to convert the DC input voltage Vin into DC output voltage Vo with appropriate voltage level and provide it to the next-stage circuit.

Figure 2:
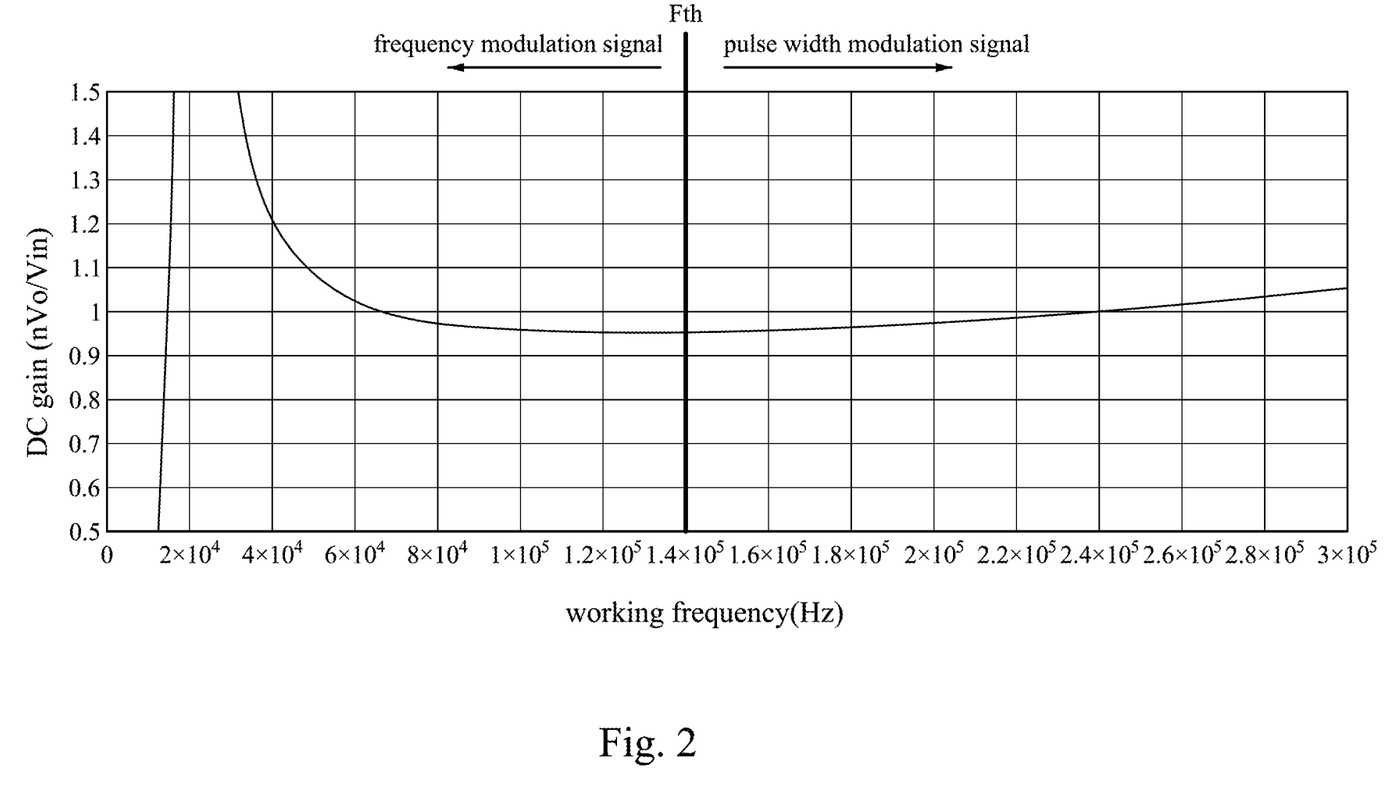
FIG. 2 is a schematic diagram illustrating switching the operation mode in accordance with some embodiments of the disclosure.

Please refer to FIG. 2. FIG. 2 is a schematic diagram illustrating of switching the operation mode in accordance with some embodiments of the disclosure. As shown in FIG. 2, the controller 150 selectively output one of a frequency modulation signal and a pulse width modulation signal as a second control signal according to a working frequency F of the first control signal CS1 to control the switching circuit 110. Specifically, the controller 150 outputs the frequency modulation signal as the second control signal CS2 to control the switching circuit 110 on the condition that the working frequency F is lower than a setting frequency Fth. In other words, the controller 150 adjusts the switching frequency of the second control signal CS2 to control the switching circuit 110. The controller 150 outputs the pulse width modulation signal as the second control signal CS2 to control the switching circuit 110 on the condition that the working frequency F is higher than the setting frequency Fth. In other words, the controller 150 adjusts the duty cycle of the second control signal CS2 to control switching circuit 110.

In some embodiments, the setting frequency Fth is the working frequency corresponding to the lowest point of the DC gain curve. For example, as shown in FIG. 2, the lowest point of the DC gain curve is located at the working frequency F of about 140 kHz. Therefore, the setting frequency Fth is about 140 kHz. The controller 150 outputs the frequency modulation signal as the second control signal CS2 on the condition that the working frequency F is lower than 140 kHz. The controller 150 outputs pulse width modulation signal as the second control signal CS2 on the condition that the working frequency F is higher than 140 kHz. It should be noted that, the value of the setting frequency Fth above is used as an example and it is not intended to limit the disclosure. Those of ordinary skilled in the art can set the setting frequency Fth based on actual need.

In this way, it is able to improve the distortion of the DC gain curve at the high frequency due to the influence of parasitic capacitors in the LLC resonant converter circuit when the load of the power converter is light, and improve the situation that the output voltage of the LLC resonant converter circuit is unstable and the conversion efficiency is reduced.

Figure 3A:
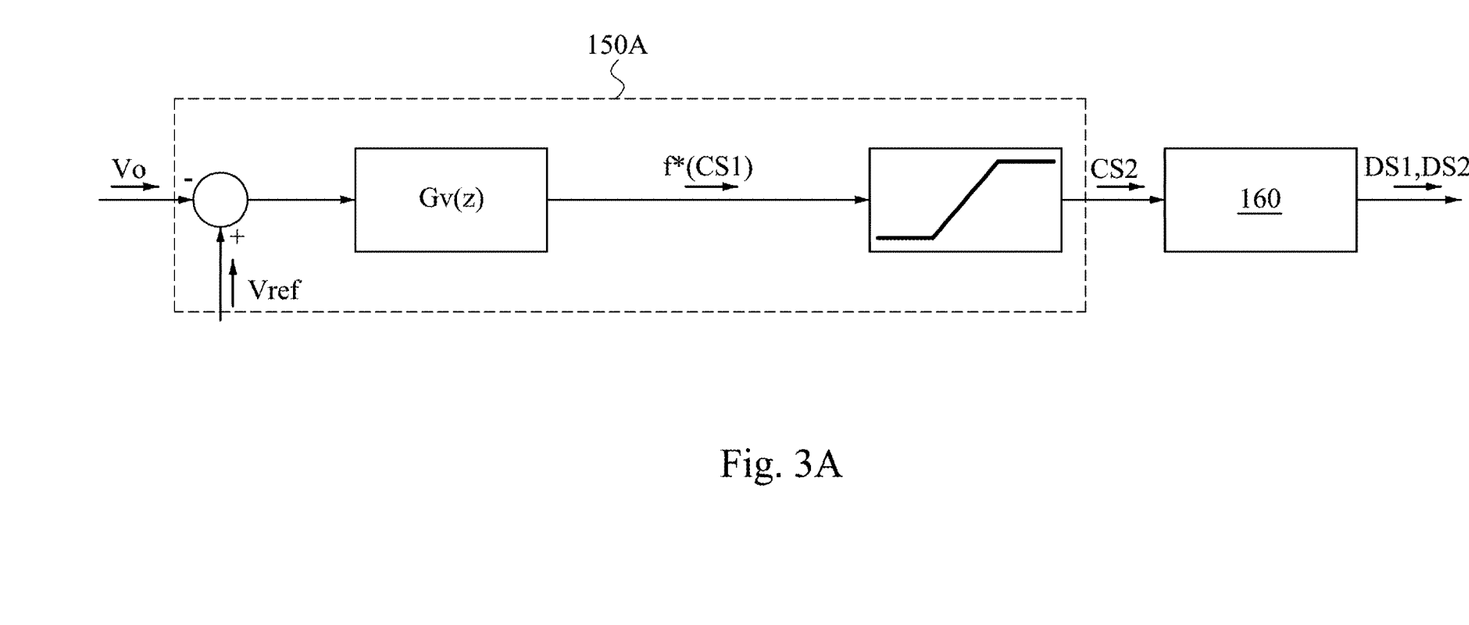
FIG. 3A and FIG. 3B are function block diagrams illustrating of a controller in accordance with some embodiments of the disclosure.

Please refer to FIG. 3A. FIG. 3A is a function block diagram illustrating of a controller 150A in accordance with some embodiments of the disclosure. In some embodiments, the controller 150A is configured to detect the output voltage Vo of the rectifying circuit 140, and obtain a frequency command f* according to the output voltage Vo and the reference voltage Vref, so as to generate the first control signal CS1 according to the frequency command f*. Specifically, as shown in FIG. 3A, the controller 150A calculates the difference between the output voltage Vo and the reference voltage Vref, obtains the frequency command f* by calculating the difference through a voltage proportional gain Gv(z), and then takes the frequency command f* as the first control signal CS1.

Next, the second control signal CS2 is obtained by adjusting the first control signal CS1 through setting the upper limit value and the lower limit value, and the driving signals DS1, DS2 are generated through the isolated driver 160 according to the second control signal CS2. In some embodiments, the upper limit value is about 250 kHz, and the lower limit value is about 36 kHz. It should be noted that, the values above are used as examples and it is not intended to limit the disclosure. Those of ordinary skilled in the art can set the setting frequency Fth based on actual need.

Figure 3B:
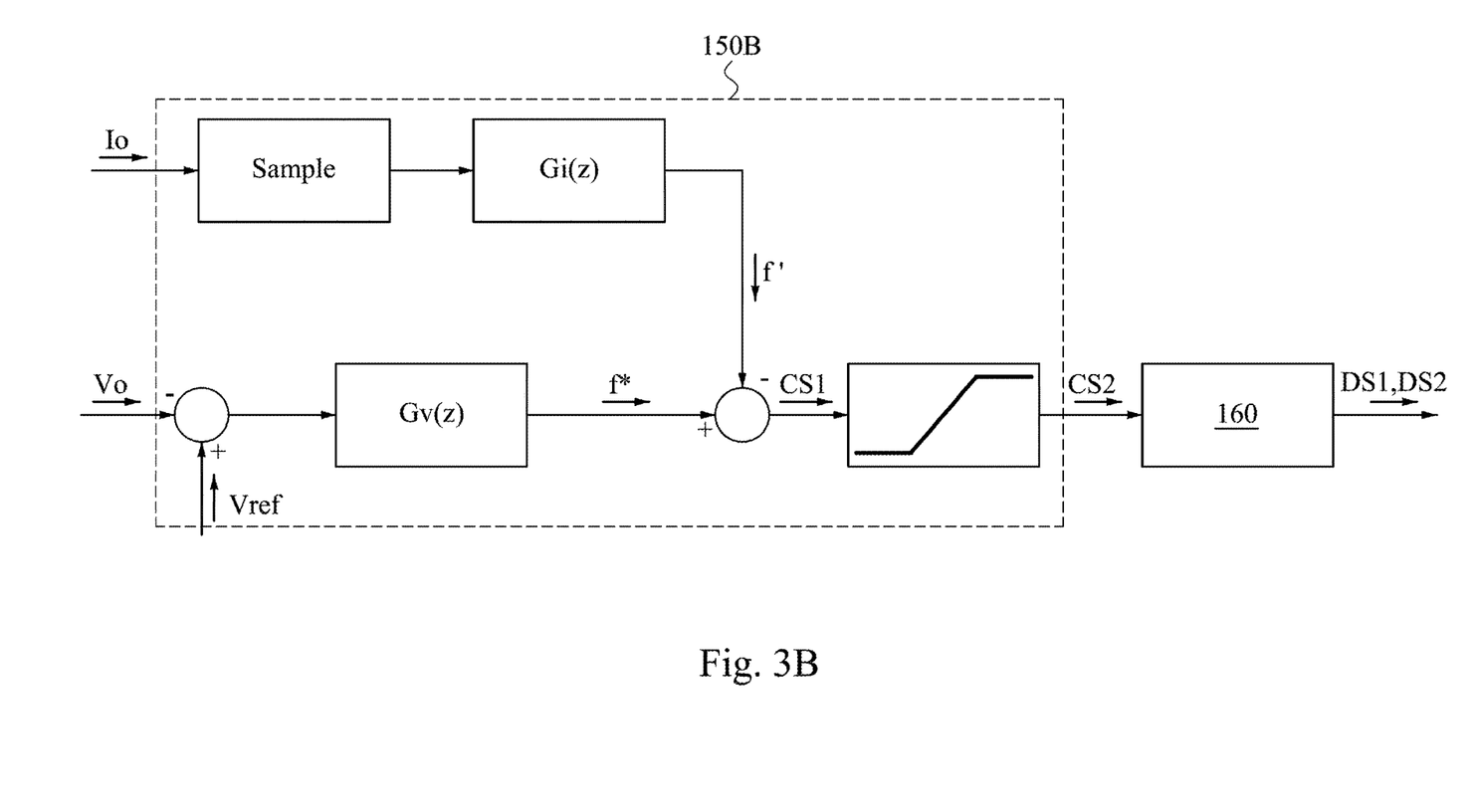

Next, please refer to FIG. 3B. FIG. 3B is a function block diagram illustrating of a controller 150B in accordance with some other embodiments of the disclosure. In embodiments shown in FIG. 3B, similar elements related to the embodiments in FIG. 3A are represented by the same references symbols and are described above, and thus further explanation is omitted. In contract to the embodiments in FIG. 3A, in the present embodiment, the controller 150B is further configured to detect the output current Io of the rectifying circuit 140, and adjust the frequency command f* by the frequency compensation value f' according to the output current Io. Specifically, as shown in FIG. 3B, after the controller 150B obtains the output current Io, the controller 150B calculates the output current Io by ADC sampling and calculates the sampling current by the current proportional gain Gi(z), so as to obtain the frequency compensation value f'. Next, the frequency command f* which is subtracted by the frequency compensation value f' is taken as the first control signal CS1. The frequency of ADC sampling is about 200 kHz.

In this way, by increasing the sampling frequency and adding the feedback signal of the current loop, it is able to improve the situation that the variation of the output voltage following the variation of the output load is too much, and reduce the overshoot of the voltage to shorten the settling time required by the LLC resonant converter circuit.

Figure 4:
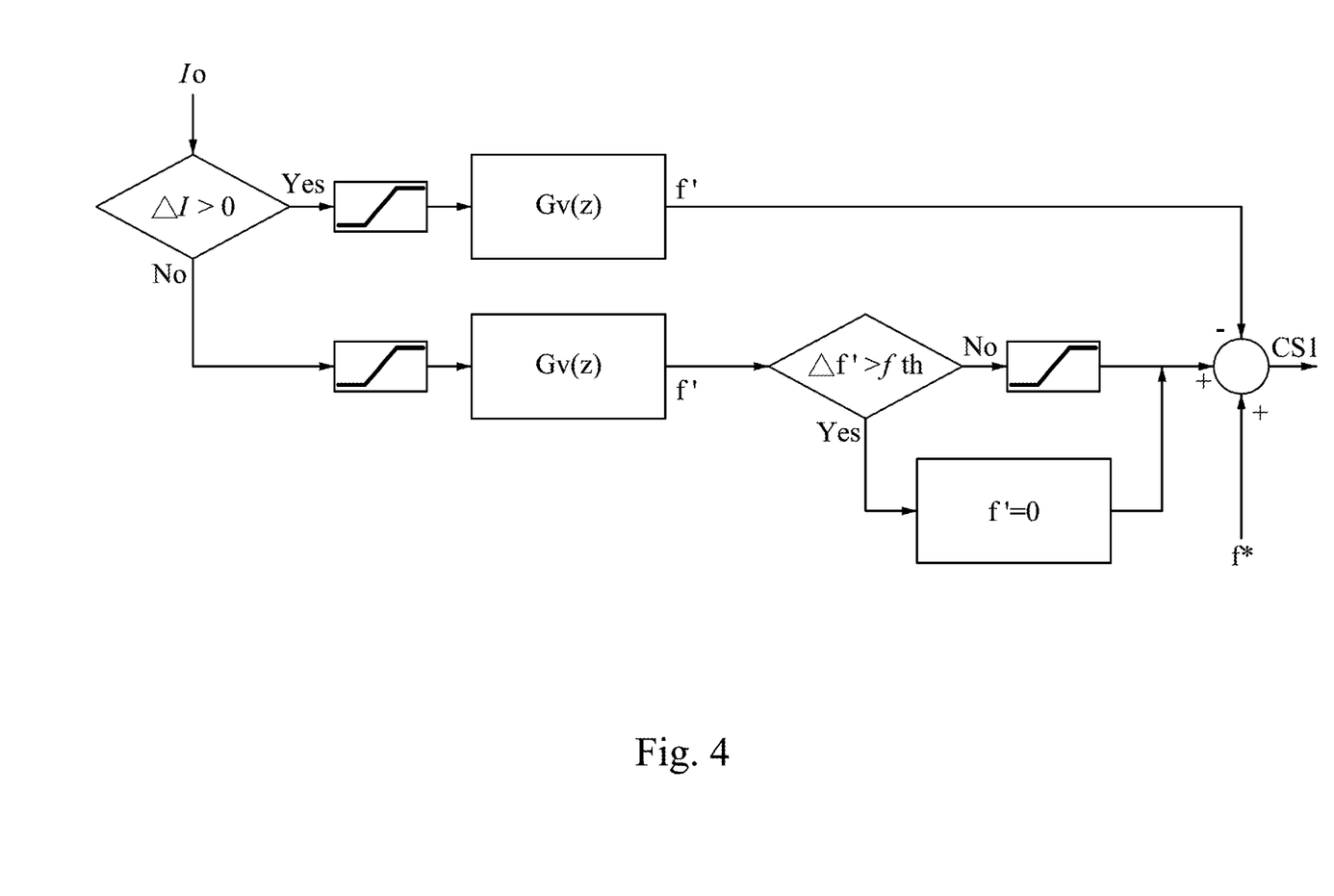
FIG. 4 is a detailed function block diagram illustrating of a controller in accordance with some other embodiments of the disclosure.

The detailed calculation about the current loop is referred to FIG. 4. FIG. 4 is a detailed function block diagram illustrating of a controller 150 in accordance with some other embodiments of the disclosure. As shown in FIG. 4, the controller 150 is further configured to determine the load according to the variation of the output current ΔI to adjust the current gain value, and adjust the frequency compensation value f' according to the current gain value, in which the variation of the output current ΔI=(the current sampled at the present moment)−(the current sampled at the previous moment).

Specifically, the frequency compensation value f' is adjusted according to the first current gain value if the controller 150 determines that the load is increased (i.e., ΔI>0). The frequency compensation value f' is adjusted according to the second current gain value if the controller 150 determines that the load is decreased (i.e., ΔI<0). The second current gain value is larger than the first current gain value.

For example, the controller 150 reduces the frequency compensation value f' according to the smaller first current gain value and reduces the frequency command f* according to the frequency compensation value f' on the condition that the output current Io is increased (i.e., the variation of the output current ΔI is larger than zero). The controller 150 increases the frequency compensation value f' according to the larger second current gain value and increases the frequency command f* according to the frequency compensation value f' on the condition that the output current Io is decreased (i.e., the variation of the output current ΔI is smaller than zero). The controller 150 sets the frequency compensation value f' to be zero, that is, does not adjust the frequency command f* on the condition that the output current Io is constant (i.e., the variation of the output current ΔI equals to zero).

In other words, under the mode that the light load is suddenly changed to heavy load (i.e., the load is increased), the current gain value in the current loop is reduced to avoid the working frequency F being too high to result the voltage shut down due to too large current gain value during the heavy load. The current gain value is dynamically adjusted according to the variation of the output current Io, in this way, the frequency compensation value f' is adjusted appropriately to increase the efficiency and avoid the circuit being unable to supply the power within the specification to the load to cause the crash (e.g., the output voltage is too low, the under voltage protection is triggered).

In addition, the controller 150 is further configured to determine whether the variation of the frequency compensation value Δf' is larger than a variation threshold Fth on the condition that the output current Io is reduced. The frequency compensation value f' is determined corresponding to the working frequency F based on a characteristic curve on the condition that the variation of the frequency compensation value Δf' is smaller than or equal to the variation threshold Fth. The frequency compensation value f' is set to be zero on the condition that the variation of the frequency compensation value Δf' is larger the variation threshold Fth.

For example, the controller 150 adjusts the frequency compensation value f' to increase the frequency command f* according to the larger second current gain value on the condition that the output current Io is reduced (i.e., the load is lighter). If the variation of the increased frequency compensation value f' is smaller than or equal to the variation threshold Fth, the controller 150 increases the frequency compensation value f' based on the characteristic curve shown in FIG. 5 according to the working frequency F by look-up table to avoid overshoot of the voltage.

Figure 5:
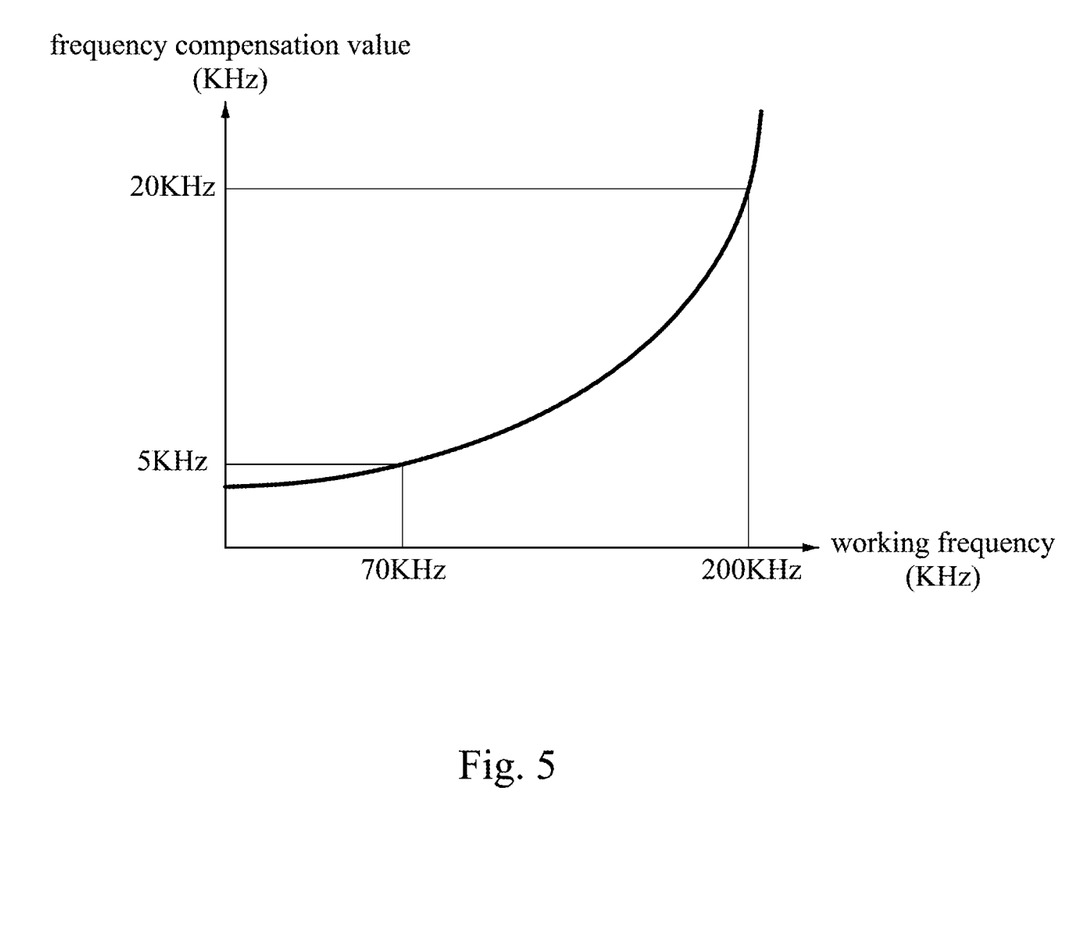
FIG. 5 is a schematic diagram illustrating of a characteristic curve of adjusting frequency in accordance with some other embodiments of the disclosure.

For another example, when the controller 150 adjusts the frequency compensation value f' to increase the frequency command f* according to the larger second current gain value on the condition that the output current Io is decreased (i.e., the load is lighter), if the variation of the increased frequency compensation value f' is larger than the variation threshold Fth, the controller 150 sets the frequency compensation value f' to be zero. In other words, when the current gain value is increased to increase the frequency compensation value f', by determining whether the variation of the frequency compensation value Δf' is larger than the variation threshold Fth, the working frequency F is avoided to be too easy to increase and to be too hard to reduce, which results in the voltage shut down. In this way, the variation of the frequency compensation value Δf' is adjusted appropriately to avoid the crush.

Figure 6:
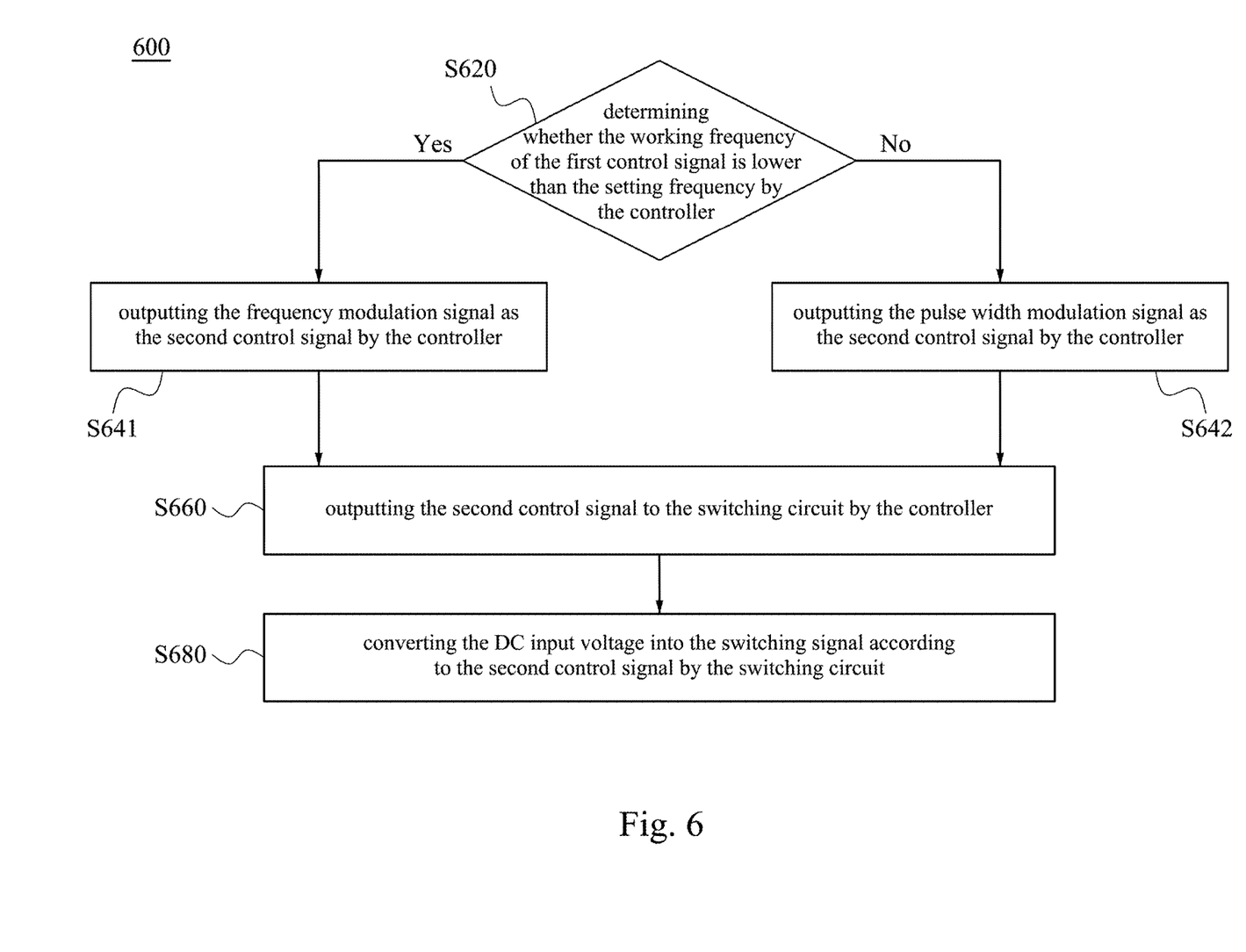
FIG. 6 is a flowchart illustrating of a power conversion circuit control method in accordance with some embodiments of the disclosure.

Please refer to FIG. 6. FIG. 6 is a flowchart illustrating of a power conversion circuit control method 600. For the convenience and clarity of explanation, the following power conversion circuit control method 600 is described in accompanying with the embodiments shown in FIG. 1-6, but not limited thereto. Various alterations and modifications may be performed on the disclosure by those of ordinary skilled in the art without departing from the principle and spirit of the disclosure. As shown in FIG. 6, the power conversion circuit control method 600 includes operations S620, S641, S642, S660 and S680.

Firstly, in the operation S620, determining, by the controller 150, whether the working frequency F of the first control signal CS1 is lower than the setting frequency Fth.

The operation S641 is executed on the condition that the working frequency F is lower than the setting frequency Fth. In the operation S641, outputting, by the controller 150, the frequency modulation signal as the second control signal CS2 to make the driving signals DS1, DS2 to be operated in frequency modulation mode. In other words, adjusting, by the controller 150, the switching frequency of the second control signal CS2 according to the working frequency F of the first control signal CS1.

On the other hand, the operation S642 is executed on the condition that the working frequency F is higher than the setting frequency Fth. In the operation S642, outputting, by the controller 150, the pulse width modulation signal as the second control signal CS2 to make the driving signals DS1, DS2 to be operated in the pulse width modulation mode. In other words, adjusting, by the controller 150, the duty cycle of the second control signal CS2 according to the working frequency F of the first control signal CS1.

Next, in the operation S660, outputting, by the controller 150, the second control signal CS2 to the switching circuit 110.

Finally, in operation S680, converting, by the switching circuit 110, the DC input voltage Vin into the switching signal Sig1 according to the second control signal CS2.

Figure 7:
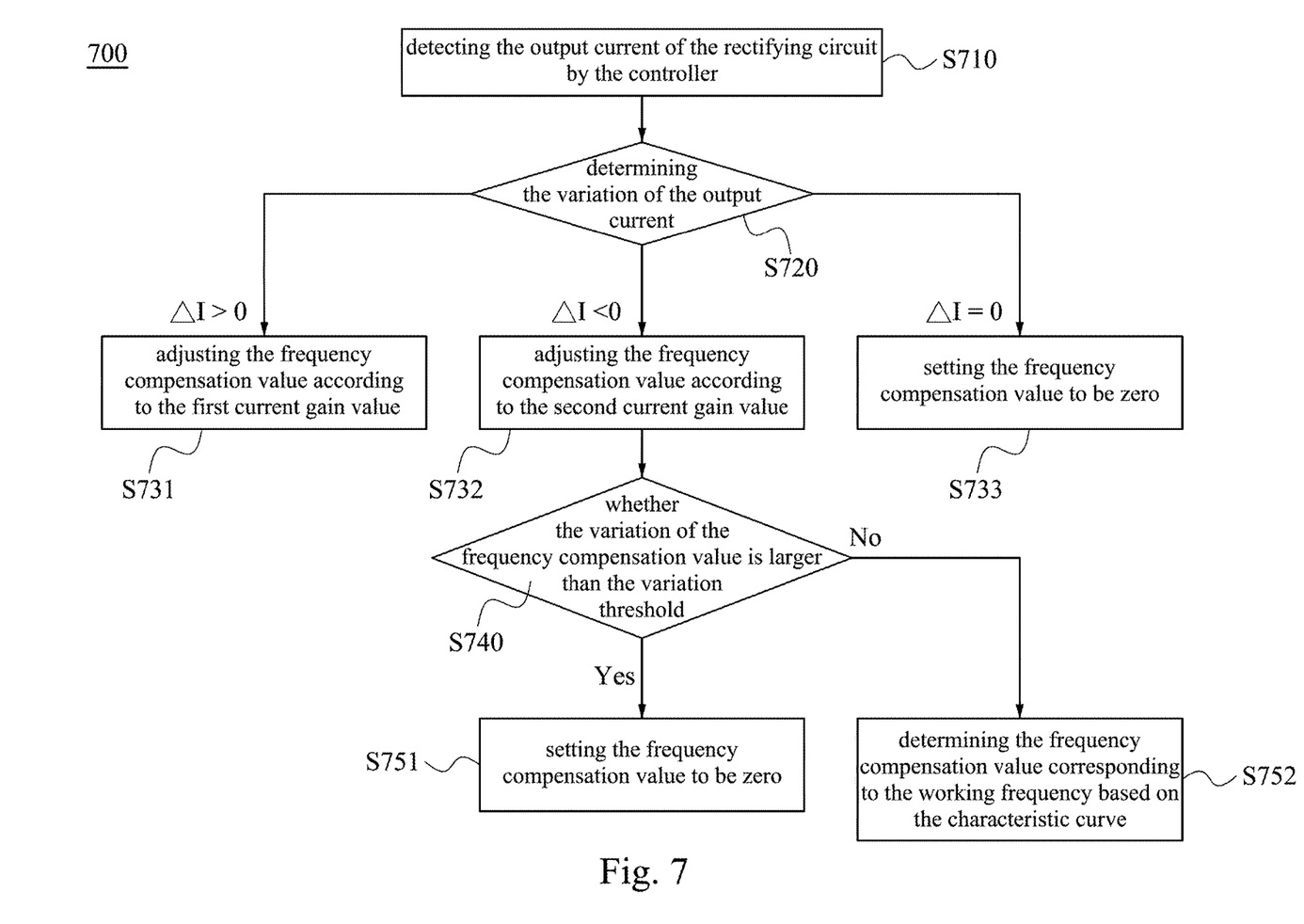
FIG. 7 is a flowchart illustrating of a power conversion circuit control method in accordance with some other embodiments of the disclosure.

Please refer to FIG. 7. FIG. 7 is a flowchart of a power conversion circuit control method 700 illustrated in accordance with some embodiments of the disclosure. For the convenience and clarity of explanation, the following power conversion circuit control method 700 is described in accompanying with the embodiments shown in FIGS. 1-7, but not limited thereto. Various alterations and modifications may be performed on the disclosure by those of ordinary skilled in the art without departing from the principle and spirit of the disclosure. As shown in FIG. 7, the power conversion circuit control method 700 includes operations S710, S720, S731, S732, S740, S751 and S752.

Firstly, in the operation S710, detecting the output current Io of the rectifying circuit 140 by the controller 150.

Next, in the operation S720, determining the load by detecting the variation of the output current Io to adjust the current gain value by the controller 150.

The operation S731 is executed on the condition that the variation of the output current Io is larger than zero (i.e., the load is increased). In the operation S731, adjusting the frequency compensation value f' according to the first current gain value and reducing the frequency command f* by the frequency compensation value f' by the controller 150.

On the other hand, the operation S732 is executed on the condition that the variation of the output current Io is smaller than zero (i.e., the load is reduced). In the operation S732, adjusting the frequency compensation value f' according to the second current gain value and increasing the frequency command f* by the frequency compensation value f' by the controller 150.

In addition, the operation S733 is executed on the condition that the variation of the output current equals to zero (i.e., the load is constant). In the operation S733, setting the frequency compensation value f' to be zero by the controller 150, that is, not adjusting the frequency command f*.

In some embodiments, the operation S740 is further executed on the condition that the variation of the output current Io is smaller than zero (i.e., the load is reduced). In the operation S740, determining whether the variation of the frequency compensation value Δf' is larger than the variation threshold Fth by the controller 150.

The operation S751 is executed on the condition that the variation of the frequency compensation value Δf' is larger than the variation threshold Fth. In the operation S751, setting the frequency compensation value f' to be zero by the controller 150, that is, not adjusting the frequency command f*.

On the other hand, the operation S752 is executed on the condition that the variation of the frequency compensation value Δf' is smaller than or equal to the variation threshold Fth. In the operation S752, determining the frequency compensation value f' corresponding to the working frequency F based on the characteristic curve by the controller 150.

In the foregoing, exemplary operations are included. However, these operations do not need to be performed sequentially. The operations mentioned in the embodiment may be adjusted according to actual needs unless the order is specifically stated, and may even be performed simultaneously or partially simultaneously.

Furthermore, each of the above embodiments may be implemented by various types of digital or analog circuits or by different integrated circuit chips. Individual components may also be integrated into a single control chip. Various control circuits may also be implemented by various processors or other integrated circuit chips. The above is only an example, and it should not limit the present disclosure.

In summary, in various embodiments of the present disclosure, it is able to improve the situation that the poor efficiency of the power conversion circuit 100 under different load by switching the operation between the frequency modulation mode and the pulse width modulation mode according to whether the working frequency F is higher than the setting frequency Fth. Furthermore, it is able to improve the situation that the response of the voltage loop is slow by adding the feedback signal of the current loop, so as to reduce the occurrence of the current and voltage overshoot, and shorten the settling time required by the power conversion circuit 100.

Although specific embodiments of the disclosure have been disclosed with reference to the above embodiments, these embodiments are not intended to limit the disclosure. Various alterations and modifications may be performed on the disclosure by those of ordinary skills in the art without departing from the principle and spirit of the disclosure. Thus, the protective scope of the disclosure shall be defined by the appended claims.

What is claimed is:

1. A power conversion circuit, comprising:
a switching circuit;
a resonant circuit electrically coupled to the switching circuit;
a transformer comprising:
a primary winding electrically coupled to the resonant circuit; and
a secondary winding;
a rectifying circuit electrically coupled to the secondary winding of the transformer; and
a controller electrically coupled to the switching circuit and the rectifying circuit, and configured to selectively output one of a frequency modulation signal and a pulse width modulation signal as a second control signal according to a working frequency of a first control signal to control the switching circuit,
wherein the controller is configured to control a duty cycle of the second control signal on the condition that the working frequency is higher than a setting frequency.

2. The power conversion circuit of claim 1, wherein the controller is configured to control a switching frequency of the second control signal on the condition that the working frequency is lower than the setting frequency.

3. The power conversion circuit of claim 1, wherein the controller is further configured to detect an output voltage of the rectifying circuit, obtain a frequency command according to the difference between the output voltage and a reference voltage, and output the first control signal according to the frequency command.

4. The power conversion circuit of claim 3, wherein the controller is further configured to detect an output current of the rectifying circuit, and adjust the frequency command by a frequency compensation value according to the output current.

5. The power conversion circuit of claim 4, wherein the controller is further configured to determine the load according to the variation of the output current to adjust a current gain value, and adjust the frequency compensation value according to the current gain value.

6. The power conversion circuit of claim 4, wherein the controller is configured to adjust the frequency compensation value according to a first current gain value on the condition that the controller determines that the load is increased, and adjust the frequency compensation value according to a second current gain value on the condition that the controller determines that the load is decreased, wherein the second current gain value is larger than the first current gain value.

7. The power conversion circuit of claim 4, wherein the controller is configured to reduce the frequency command according to the frequency compensation value on the condition that the variation of the output current is larger than zero.

8. The power conversion circuit of claim 4, wherein the controller is further configured to determine whether the variation of the frequency compensation value is larger than a variation threshold on the condition that the variation of the output current is smaller than zero, and set the frequency compensation value to be zero if the variation of the frequency compensation value is larger than the variation threshold.

9. The power conversion circuit of claim 4, wherein the controller is further configured to determine whether the variation of the frequency compensation value is larger than a variation threshold on the condition that the variation of the output current is smaller than zero, and determine the frequency compensation value corresponding to the working frequency based on a characteristic curve if the variation of the frequency compensation value is smaller than or equal to the variation threshold.

10. The power conversion circuit of claim 1, further comprising:
an isolated driver electrically coupled between the controller and the switching circuit, and configured to feedback to drive the switching circuit.

11. A control method of a power conversion circuit, comprising:
- detecting, by the controller, an output voltage and an output current of a rectifying circuit of the power conversion circuit;
- obtaining, by the controller, a frequency command according to the difference between the output voltage and a reference voltage;
- adjusting, by the controller, the frequency command by a frequency compensation value according to the output current;
- outputting, by a controller, a second control signal according to the frequency command; and
- converting, by a switching circuit of the power conversion circuit, a DC input voltage into a switching signal according to the second control signal.

12. The control method of the power conversion circuit of claim 11, further comprising:
- controlling, by the controller, a switching frequency of the second control signal on the condition that a working frequency of the frequency command is smaller than a setting frequency; and
- controlling, by the controller, a duty cycle of the second control signal on the condition that the working frequency is larger than the setting frequency.

13. The control method of the power conversion circuit control method of claim 11, further comprising:
- determining, by the controller, the load according to the variation of the output current to adjust a current gain value; and
- adjusting, by the controller, the frequency command according to the current gain value.

14. The control method of the power conversion circuit of claim 13, wherein the operation of determining the load to adjust the current gain value according to the variation of the output current comprises:
- adjusting, by the controller, the frequency compensation value according to a first current gain value if the controller determines that the load is increased; and
- adjusting, by the controller, the frequency compensation value according to a second current gain value if the controller determines that the load is decreased, wherein the second current gain value is larger than the first current gain value.

15. The control method of the power conversion circuit of claim 13, wherein the operation of determining the load to adjust the current gain value according to the variation of the output current comprises:
- reducing, by the controller, the frequency command according to the frequency compensation value if the variation of the output current is larger than zero.

16. The control method of the power conversion circuit of claim 13, wherein the operation of determining the load to adjust the current gain value according to the variation of the output current comprises:
- determining, by the controller, whether the variation of the frequency compensation value is larger than a variation threshold if the variation of the output current is smaller than zero; and
- setting, by the controller, the frequency compensation value to be zero if the variation of the frequency compensation value is larger than the variation threshold.

17. The control method of the power conversion circuit of claim 13, wherein the operation of determining the load to adjust the current gain value according to the variation of the output current comprises:
- determining, by the controller, whether the variation of the frequency compensation value is larger than a variation threshold if the variation of the output current is smaller than zero; and
- determining, by the controller, the frequency compensation value corresponding to the working frequency based on a characteristic curve if the variation of the frequency compensation value is smaller than or equal to the variation threshold.

18. The control method of the power conversion circuit of claim 11, further comprising:
- receiving, by an isolated driver, the second control signal of the controller and feeding back a driving signal to drive the switching circuit.

* * * * *